UNITED STATES PATENT OFFICE.

CARLETON ELLIS, OF MONTCLAIR, NEW JERSEY, ASSIGNOR TO ELLIS-FOSTER CO., A CORPORATION OF NEW JERSEY.

OIL-PROOFED CONTAINER AND PROCESS OF MAKING SAME.

1,385,941.  Specification of Letters Patent.  Patented July 26, 1921.

No Drawing.   Application filed September 19, 1917.  Serial No. 192,233.

*To all whom it may concern:*

Be it known that I, CARLETON ELLIS, a citizen of the United States, and a resident of Montclair, in the county of Essex and State of New Jersey, have invented certain new and useful Improvements in Oil-Proofed Containers and Processes of Making Same, of which the following is a specification.

This invention relates to a method of oil-proofing concrete and to the product of such process and the invention is particularly directed to the treatment of concrete tanks for holding oils and the like, to enable these to be used in place of steel tanks. The invention is also applicable in some cases to the oil-proofing of other structural material, such as wood and the like.

According to the present invention, I make use of cellulose sulfite waste liquor, which is preferably concentrated to the consistency of a thin or thick syrup and this material is applied to the container, as for example, to the interior surface by brush or spray to give a coating filling the pores of the concrete and rendering it resistant to and proof against the penetration of oil. The sulfite liquor may be applied in the form of an aqueous solution of any suitable density, or in the form of an emulsion with oil, etc., if desired, although this ordinarily is not necessary, except when special waterproofing effects are required. A liquor of slightly acid character is preferred in some cases to a neutral liquor. The coating may be rendered fairly resistant to the action of moisture by dusting over the surface a quantity of powdered quicklime or by incorporating quicklime with the sulfite liquor and applying this composition to the surface of the concrete as rapidly as possible in order to prevent initial setting or change before the mass has been properly laid on the surface. Other insolubilizing agents to render the material waterproof may also be used and in some cases it is possible to apply a mixture of sulfite liquor and lime or Portland cement or similar material which may be troweled on the surface in the form of a thick layer or veneer, as the case may be, to secure the desired proofing effect.

Other insolubilizing agents such as barium oxid or hydrate, zinc oxid, magnesium oxid, and the like, also may be used if desired, although in many cases it is sufficient merely to coat the tank on the inside with the sulfite liquor either by brushing, spraying, or in any other suitable manner, when contact with the oil subsequently introduced into the tank will sufficiently protect the coating against moisture. The outside of the tank may however, be treated with a coating of asphaltum or heavy oil to prevent the penetration of moisture from the outside. When oils containing moisture are used, it is desirable to waterproof the sulfite liquor by lime or other similar treatment.

In view of the rough character of concrete it is desirable to apply the sulfite liquor by spraying, and in fact, under such conditions it is well to leave the inside surface of the tank in a somewhat rough and open or porous condition so as to allow of the penetration of the sulfite liquor to a considerable distance, thereby producing an efficient oil resisting layer.

In place of using the sulfite liquor in the form of a liquid such as may be obtained by concentrating to any desired degree, the raw or crude liquor, or such a liquor as may be prepared by diluting ordinary commercial concentrated liquor or the dried solids with water or other aqueous medium, the dried solids themselves may be incorporated with a powder such as lime or Portland cement moistened with water and applied to the surface of the container or the container itself may be made with the addition of a sufficient amount of the liquor or its dried solids to produce when made into a plastic mass and formed into shape a tank or holder which will be impervious to oil.

What I claim is:—

1. The process of oil-proofing concrete tanks which comprises applying thereto an acid solution of sulfite cellulose waste liquor and permitting the latter to react with the alkali of the concrete.

2. The process of oil-proofing concrete containers which comprises applying thereto a solution whose dissolved components consist substantially of sulfite cellulose waste liquor solids, to form a coating of a hard oil impervious character.

3. The process of oil-proofing concrete containers which comprises applying thereto a solution whose dissolved components consist substantially of sulfite cellulose waste liquor solids of acid reaction and in allowing the solution to react with the alkali of the concrete to form a coating of a hard oil impervious character.

CARLETON ELLIS.